July 31, 1945.   J. E. McDEVITT   2,380,535
AIRCRAFT
Filed Oct. 27, 1941   3 Sheets-Sheet 1
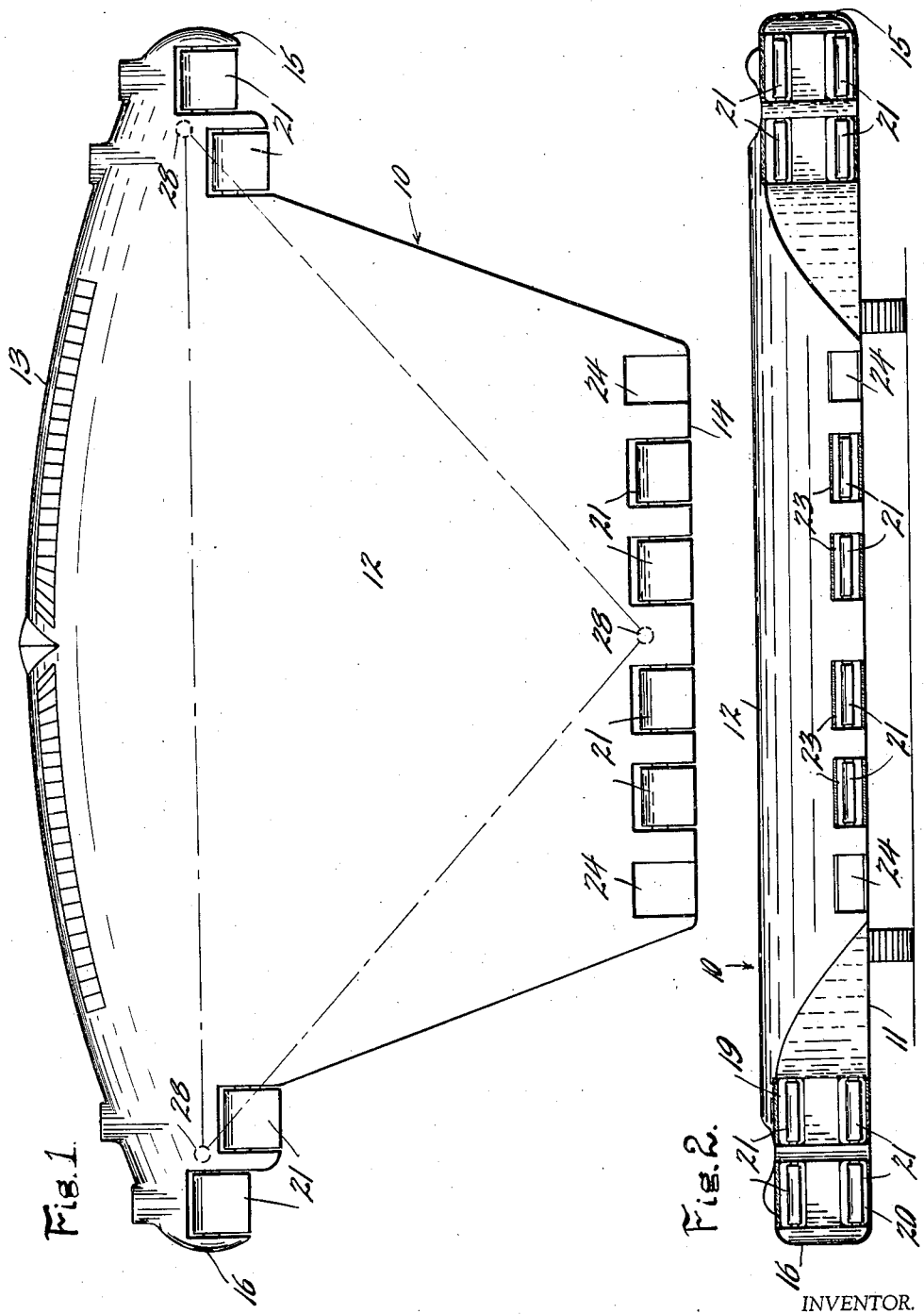
INVENTOR.
James E. McDevitt.
BY Watson, Cole, Grindle
& Watson
ATTORNEYS

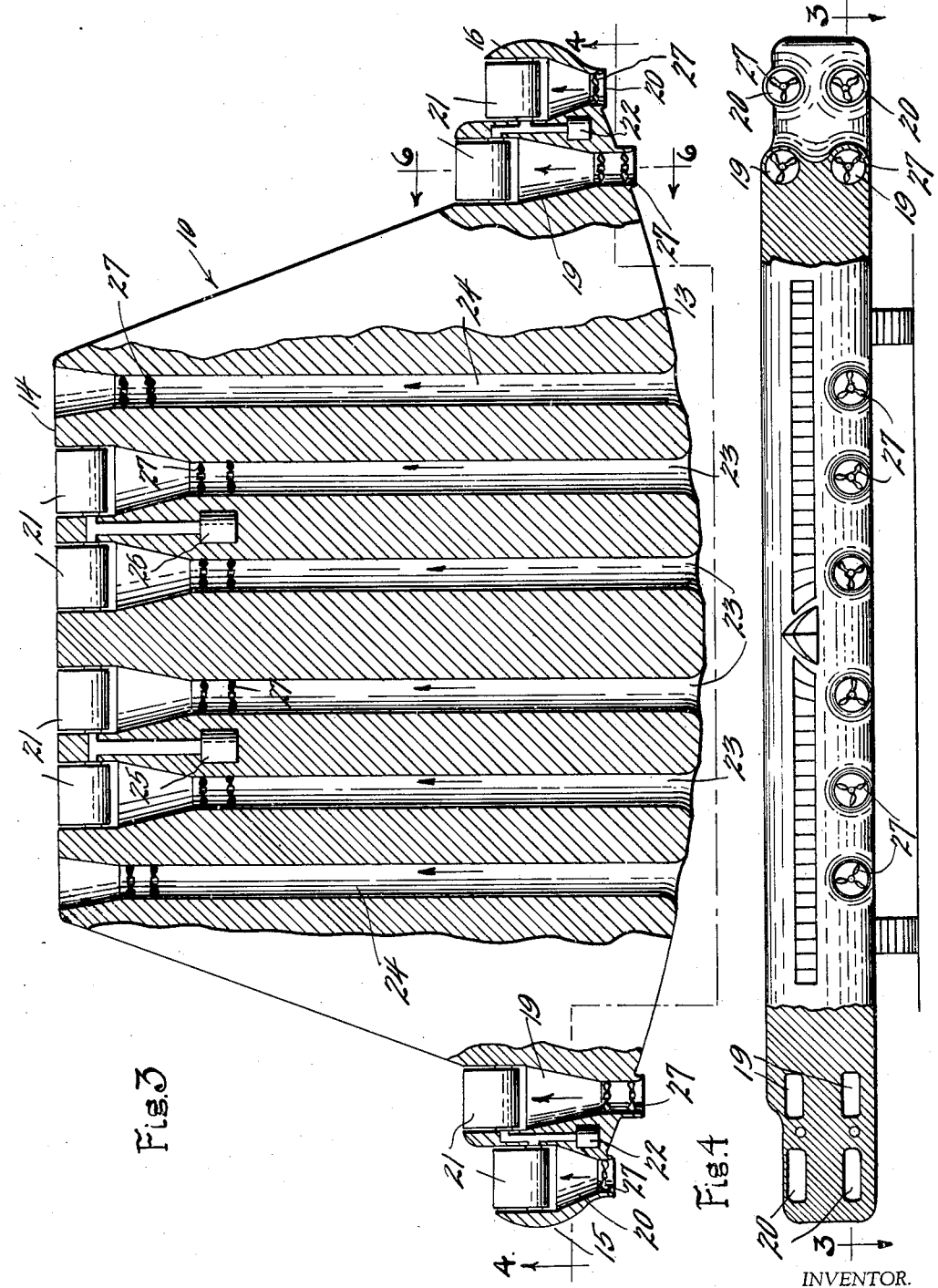

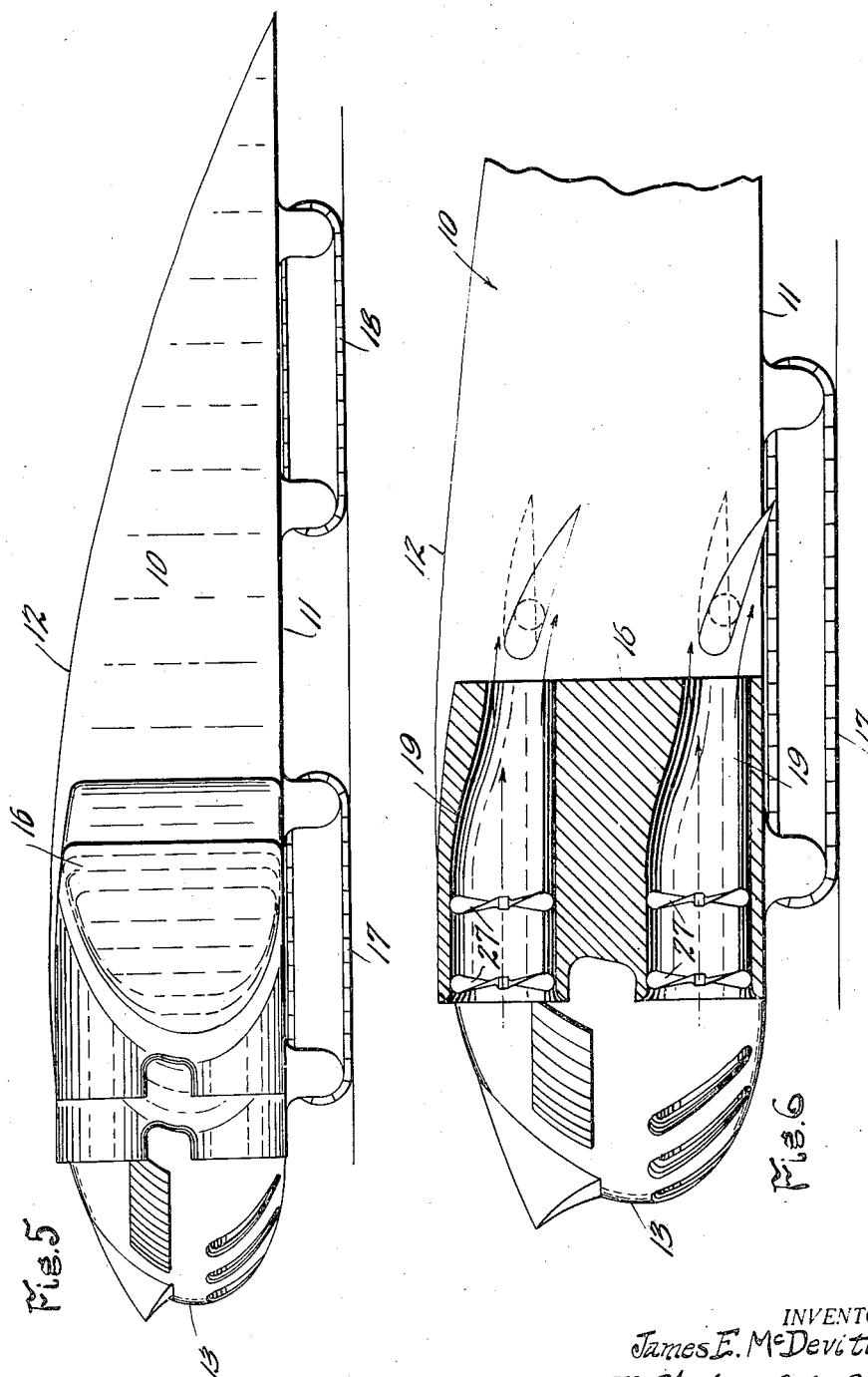

Patented July 31, 1945

2,380,535

UNITED STATES PATENT OFFICE 2,380,535

AIRCRAFT

James E. McDevitt, Brooklyn, N. Y.

Application October 27, 1941, Serial No. 416,717

4 Claims. (Cl. 244—12)

The present invention relates to aircraft of the heavier-than-air type and has for its general object the provision of a novel and improved form of aircraft which is capable of vertical ascent and descent, may be constructed in very large sizes and yet may take off and land in safety on relatively small air fields, has a greatly enlarged carrying capacity, and which eliminates the use of rudders, ailerons and elevators, such as are employed in connection with aeroplanes of standard design.

A further object of the present invention is the provision of an aircraft of the class described, in which the body of the craft itself takes the general form of a lifting airfoil, such as the wing of a standard plane, there being no wings as distinguished from the main body of the craft, and in which the several power plants are located within the body of the craft, the propellers being disposed in tunnels or longitudinal passages extending through the body of the craft whereby, in forward motion, the lifting effect of the airfoil-shaped body is unhampered by the turbulence resulting from externally placed power plants and propellers.

A further object is the provision of an aircraft of the class described, capable of vertical ascent and descent, in which the lifting elements are distributed in such a way that the lifting forces predominate at three or more spaced points, whereby the stresses exerted upon the mechanical structure of the craft are so distributed as to permit of a lighter type of construction than would otherwise be the case.

A further object is the provision, in an aircraft of the class described, of a plurality of spaced passages or tunnels extending through the body of the craft, lifting airfoils disposed rearwardly and in alignment with certain of said tunnels, means in said latter tunnels for propelling streams of air rearwardly over said lifting air foils to create the lift necessary for vertical ascent, and means in others of said tunnels for counterbalancing the forward thrust resulting from the rearwardly directed air streams, whereby the craft is restrained from forward movement during ascent and descent.

The present invention is designed to eliminate one of the factors limiting the practical size of aircraft of the heavier-than-air type, which factor is the length of run required for take-off and descent. Present-day planes of large capacity require a relatively long runway, and hence a large air field, for taking off and landing, for the reason that the lift exerted on the plane derives from the forward motion of the plane, and a relatively long distance is required to accelerate and decelerate the planes of large size. Furthermore, due to the inertia of such planes in forward motion, the dangers encountered in taking off and landing are considerably increased as the size and weight of the plane increases and for these reasons it appears, at present, to be entirely impractical to operate, from existing air fields, planes in excess of about 100 tons gross weight. On the other hand, in accordance with the present invention, it is contemplated to achieve vertical take-off and ascent by blowing air at a very high velocity over a plurality of lifting air foils, the air streams having a velocity much greater than any take-off speed (of a conventional plane) which would be practical. Thus, while it is dangerous to operate a conventional plane which has a take-off or landing speed in excess of about 100 miles per hour, it is possible, according to the present invention, to exert upon the lifting airfoils of an aircraft a degree of lift corresponding to an air speed of 300 miles per hour or greater. By so doing, and at the same time counterbalancing the forward thrust thus created upon the craft, vertical ascent and descent may be obtained. The lifting forces may be enhanced, furthermore, by providing adjustable airfoils which may be set at the optimum angle of attack, whereas in the conventional plane, wherein the lifting airfoil is the wing of the plane and is immovably attached to the fuselage, the angle of attack must be coordinated with a variety of factors other than the optimum angle for take-off and landing.

It should further be noted that in conventional planes, the lifting effect of the wings is hampered by the turbulence resulting from the external disposition of the power plants and propellers, whereas, in accordance with the present invention, the air streams passing over the lifting airfoils are undisturbed by such obstructions and, in forward flight, the entire upper surface of the craft is available as a lifting airfoil, the flow of air thereover, due to forward motion, being in nowise disturbed since the power plants and propellers are disposed within the body of the craft.

These and numerous other objects, features and advantages of the present invention will be apparent to one skilled in the art from the following description taken in connection with the accompanying drawings in which:

Figure 1 is a plan view of an aircraft construction in accordance with the present invention;

Figure 2 is a rear elevation of said aircraft;

Figure 3 is a horizontal section through said aircraft illustrating the disposition of the tunnels, lifting airfoils and propelling means;

Figure 4 is a view partly in elevation and partly in vertical section on the line 4—4 of Figure 3;

Figure 5 is a side elevation of the aircraft; and

Figure 6 is a vertical section on line 6—6 of Figure 3.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring particularly to Figures 1 and 5, it will be seen that the body 10 of the aircraft is generally of the shape of a lifting airfoil, such as the wing of a standard plane, having a flat undersurface 11 and a convex upper surface 12. The leading edge 13 is of arcuate form and is somewhat longer than the trailing edge 14, which is preferably straight. The sides of the body 10 taper outwardly toward the leading edge, the forward part of the body extending sufficiently beyond the sides thereof to provide the lateral tip portions 15 and 16. A pilot room and passage compartments are provided adjacent the leading edge of the body 10, while considerable cargo space is available rearwardly thereof.

Since it is intended that aircraft of the present type may be constructed in very large sizes, say of 1,000 to 1,500 gross tons, it is preferred to provide landing gear of the caterpillar type, as conventionally indicated at 17, 18 in Figure 5, so as to distribute the weight of the craft over a relatively large ground area.

As best seen in Figures 3, 4, and 6 each lateral tip portion 15, 16 is provided with a plurality of passages or tunnels 19, 20 extending from front to rear, the tunnels 20 being somewhat shorter than the tunnels 19. In the illustrated embodiment, each lateral tip is provided with four tunnels arranged at two levels, but the number may be varied.

Pivotally supported in alignment with the rear end of each tunnel 19, 20 is a lifting airfoil 21 having any suitable aerodynamic section adapted for the purpose, and means (not shown) are provided for varying the angle of attack of the airfoils 21. If desired, the airfoils 21 may be slotted and blower means 22 may be provided for continuously removing the boundary layer of air from the airfoils 21 in order to improve their coefficient of lift, in the well-known manner. It will be observed that the tunnels 19 and 20 are flattened and transversely elongated in their rearward portions so that the rearward orifice of each tunnel is approximately the same width as the associated airfoil 21, and of somewhat greater vertical dimensions than said airfoil.

Extending from front to rear through the central portion of the body 10, there are provided a plurality of passages or tunnels 23, each of which is provided at its rearward end with a lifting airfoil 21, and a further pair of tunnels 24 with which no airfoils are associated. Blowers 25 and 26 are provided for removing the boundary layer of air from the air-foils 21 associated with the tunnels 23.

Each of the tunnels 19, 20, 23 and 24 is provided with one or more propellers 27, adapted to be driven by internal combustion engines (not shown) disposed in the tunnels or, if desired, the several power plants may be disposed externally of the tunnels but within the body 10 of the craft, in which case they will of course be suitably geared to the propellers 27. The latter are of the adjustable pitch type, and those associated with the tunnels 24 are of the reversible type, i. e., their pitch may be reversed in order that the air stream in the tunnels 24 may be directed either forwardly or rearwardly without reversing the direction of rotation of the propellers in said tunnels. If desired, the direction of rotation may be reversed, instead of reversing the pitch of the propellers.

Referring to Figure 1, it will be seen that three gyro-stabilizers 28 are employed, one in each lateral tip, 15, 16 of the body, and one disposed on the longitudinal axis of the body adjacent the rearward edge thereof. In this manner, one of the gyro-stabilizers 28 is disposed adjacent each portion of the body 10 at which a maximum lifting effect occurs. The gyro-stabilizers 28 are supported for rotation about vertical axes, and conventional means (not shown) are provided for tilting their respective spindles in order to direct the craft upwardly or downwardly during forward flight, thus eliminating the necessity for the usual elevators. The gyro-stabilizers also serve the purpose of ensuring that the craft will be maintained on an even keel during ascent and descent. Preferably, for purposes of level flight, the stabilizers are mounted with their rotors at the same level.

As is well known, aircraft of the heavier-than-air type are enabled to rise and remain in the air due to the lift exerted on the airfoils or wings thereof by the suction or vacuum created by the rearward flow of air thereover. In an aeroplane of conventional type, this lifting effect is created by the forward movement of the plane which, at take off, may create a flow of air over the wings at a speed of 50 to 100 miles per hour, but hardly any greater than the latter figure. According to the present invention, the rearwardly directed air streams passing over the airfoils 21 may have speeds up to 300 miles per hour or greater, thus vastly increasing the lifting effect. Also, since the airfoils 21 may be set at any angle relative to the body of the craft, they may be disposed at the optimum angle of attack, for example, in the neighborhood of 18°, whereas the wings of a conventional aeroplane may not be so adjusted. Due to these factors, and to the removal of the boundary layer by the means previously described, the lifting forces exerted upon the airfoils 21 may be made relatively tremendous so that the comparatively small lifting airfoil surfaces may be made to exert sufficient lift to cause the ascent of an aircraft of relatively great size and weight.

In order that the ascent may be vertical, thus permitting the craft to use air fields of normal size or smaller, upon take off and descent, the propellers in the tunnels 24 are reversed so as to direct their respective air streams forwardly, thus counterbalancing the forward thrust upon the other propellers. It will be appreciated that a lesser number of propellers directed forwardly is required, since the forward thrust upon the rearwardly directed propellers is partially counterbalanced by the rearward thrust exerted by the several air streams upon the lifting airfoils 21.

After the desired altitude is reached, the propellers in the tunnels 24 are reversed or directed rearwardly, and the airfoils 21 are adjusted for level flight by diminishing their angle of attack.

In forward flight, lateral angularity or yaw may be controlled by adjusting the speeds of the respective propellers, and the leading edge of the craft may be elevated or depressed by means of the gyro-stabilizers as described above. Rotation of the plane about its longitudinal axis, i. e. bank, may be controlled by adjustments of the airfoils 21 at the respective lateral tips 15 and 16 of the craft. Thus all necessity for rudders, elevators, and ailerons is eliminated.

Upon descent, the lifting airfoils 21 are again adjusted to the optimum angle, and the propellers in the tunnels 24 are reversed, whereby a vertical descent may be obtained. In ascending and descending, rotation or spinning of the craft about its vertical axis is prevented by properly adjusting the speeds of the respective air streams.

It is estimated that a craft constructed in accordance with the present invention, and having a gross weight of 1,500 tons (approximately fifteen times as large as the largest conventional aeroplanes now in service) will have a pay-load capacity of at least 400 tons and, powered by twenty motors of 2,500 H. P. each, will have a ceiling of 40,000 feet and a forward speed, at that altitude, of approximately 300 miles per hour. It is, of course, understood that, if desired, and for the purpose of increasing the lift of the craft during forward flight, the boundary layer of air may be removed from the entire body of the craft by means of suction in the conventional manner.

Having thus described the invention, what is claimed as new and desired to be secured by Letters Patent is:

1. In aircraft of the heavier-than-air type, a body portion having the general contour of a lifting airfoil and having a plurality of spaced passages extending therethrough from front to rear, means in each said passage for propelling a stream of air therethrough, and adjustable lifting airfoils disposed immediately behind the rearward ends of certain of said passages and lying in the paths of the air streams through the associated passages, said propelling means being constructed and arranged to force air rearwardly through said passages having air foils associated therewith, and to force air forwardly through the other passages upon take-off and landing.

2. In aircraft of the heavier-than-air type, a body portion having the general contour of a lifting airfoil, and having a central portion and lateral tips, the central portion of said body having a relatively great longitudinal dimension and said lateral tips having a relatively small longitudinal dimension and being disposed adjacent the forward edge of said body, a plurality of passages extending from front to rear of each said lateral tip, adjustable lifting airfoils secured in alignment with the rearward portion of each said passage, means in each said passage for propelling a stream of air rearwardly through said passage and over said airfoil, a plurality of passages extending from front to rear through said central body portion, and propelling means in each of said last-mentioned passages, certain of said propelling means being constructed and arranged to force air forwardly through the associated passages upon take-off and landing.

3. In aircraft of the heavier-than-air type, a body portion having the general contour of a lifting airfoil and having a plurality of spaced passages extending therethrough from front to rear, means in said passages for propelling streams of air rearwardly therethrough, adjustable lifting airfoils disposed immediately behind the rearward ends of said passages and lying in paths of said air streams, and means for counteracting the forward thrust on said aircraft resulting from the reaction of the air on said propelling means.

4. Aircraft as defined in claim 3, said passages being cylindrical throughout the forward portions thereof, and being flattened and transversely elongated toward their rearward ends.

JAMES E. McDEVITT.